United States Patent
Goddard et al.

(10) Patent No.: US 7,487,980 B2
(45) Date of Patent: Feb. 10, 2009

(54) SULKY SHAFT CONNECTOR DEVICE

(76) Inventors: Ron Goddard, 7779, Boul Lasalle, #408, Lasalle, Quebec (CA) H89 3K3; Larry Lessard, 3540, Hutchison, Montreal, Quebec (CA) H2X 2H2; Marc-André Octeau, 20, Soeurs-Grises, #502, Montréal, Quebec (CA) H3C 5M1; Eric St-Amant, 256, Nadeau, Repentigny, Quebec (CA) J5Y 3J4

( * ) Notice: Subject to any disclaimer, the term of this patent is extended or adjusted under 35 U.S.C. 154(b) by 534 days.

(21) Appl. No.: 11/261,481

(22) Filed: Oct. 31, 2005

(65) Prior Publication Data

US 2006/0101791 A1    May 18, 2006

Related U.S. Application Data

(60) Provisional application No. 60/623,228, filed on Nov. 1, 2004.

(51) Int. Cl.
*B62C 1/08* (2006.01)
(52) U.S. Cl. ............... 280/63; 280/65; 280/47.131; 280/47.15; 54/39.1; 54/2; 54/3
(58) Field of Classification Search ............ 280/63, 280/65, 47.131, 47.15; 54/39.1, 2, 3; D12/19
See application file for complete search history.

(56) References Cited

U.S. PATENT DOCUMENTS

| 757,575 | A | * | 4/1904 | St. Clair | 280/65 |
|---|---|---|---|---|---|
| 809,577 | A | * | 1/1906 | McKenzie | 54/50 |
| 3,907,325 | A | * | 9/1975 | Gaines et al. | 280/657 |
| 4,326,367 | A | | 4/1982 | Cashman | |
| 4,473,991 | A | * | 10/1984 | La Mura et al. | 54/2 |
| 4,480,428 | A | | 11/1984 | Gilbertson | |
| 4,986,059 | A | * | 1/1991 | Boutilier | 54/2 |
| 5,056,301 | A | * | 10/1991 | Garland et al. | 54/2 |
| 5,081,826 | A | * | 1/1992 | MacKay | 54/2 |
| 5,255,499 | A | * | 10/1993 | Hodsdon | 54/2 |
| 6,446,419 | B1 | | 9/2002 | Terwilliger | |
| 6,588,186 | B2 | * | 7/2003 | Knox | 54/69 |
| 2003/0009997 | A1 | | 1/2003 | Knox | |
| 2005/0023784 | A1 | * | 2/2005 | Harmer et al. | 280/63 |

* cited by examiner

*Primary Examiner*—Christopher P Ellis
*Assistant Examiner*—Jacob Meyer

(57) ABSTRACT

A sulky shaft connector device includes a swivel ball joint arrangement whereby the sulky shaft is allowed relative damped vertical movement with respect to the harness. A sulky shaft connector member, removably connected to the sulky shaft, forming part of the device also provides for quick and releasable engagement between the sulky shaft and the sulky shaft connector device.

17 Claims, 6 Drawing Sheets

SULKY SHAFT CONNECTOR DEVICE

CROSS REFERENCE TO RELATED APPLICATIONS

Benefit of U.S. Provisional Application for patent application Ser. No. 60/623,228, filed on Nov. 1, 2004, is hereby claimed.

FIELD OF THE INVENTION

The present invention concerns racing sulky harnesses, more particularly to a racing sulky shaft connector device for use with a harness.

BACKGROUND OF THE INVENTION

Lameness represents one of the greatest threats to the health and racing careers of racehorses and is particularly relevant with Standardbreds that are used in harness racing. Harness racing involves connecting a sulky, or bike, to the racehorse, which is driven by a rider sitting rearwardly of the sulky. The sulky typically includes a frame, two wheels, a seat for the rider and two elongate shafts for connecting to a horse harness on either side of the horse. The rider sits on the seat and controls the horse using reins. In harness racing, a generally oval racetrack is used, which is banked upwards and away from the center. During a race, the workload performed by the horse includes transport of its own mass against air resistance, the track surface, centrifugal forces as well as the sulky and rider's mass. The rider's center of mass is typically located behind the wheel axles, which causes the sulky to lift upwardly at the sulky shafts and hinder the horse's natural running gait. Moreover, the horse's natural running gait causes the horse's sides lateral torso to move up and down during full forward and rearward limb extensions, with the force of this action being transferred to the sulky wheels via the harness connector and the sulky frame thereby causing the sulky wheels to oscillate. The aforesaid factors combine to decrease the efficiency of the horse's running form, which in turn can significantly reduce the speed and comfort of the horse. Moreover, current sulky designs and the track's banking combine to cause upper body and lower leg injuries to the horse. This may significantly reduce the racing career of the horse and cause costly veterinarian bills.

Many designs of sulky shaft connector exist, a few examples of which are as follows:

U.S. Pat. No. 4,326,367, issued Apr. 27, 1982 to Cashman for "Racing Sulky and Harness";

U.S. patent application No. US2003/0009997, published Jan. 16, 2003 to Knox for "Apparatus and Method for Quickly Releasing a Harness from a Vehicle";

U.S. Pat. No. 6,446,419, issued Sep. 10, 2002 to Terwilliger for "Swivel Joint Quick Hitch for Harness Racing"; and U.S. Pat. No. 4,480,428, issued Nov. 6, 1984 to Gilbertson for "Shaft Coupler"; and U.S. Pat. No. 4,473,991, issued Oct. 2, 1984 to La Mura for "Harness Connector".

The aforesaid designs suffer from a number of important drawbacks. Disadvantageously, none of the designs appears to be of sufficient flexibility in the harness system to allow the horse's movements to be independent of the sulky shafts. Some of the designs are of a complex construction, which may add mass to the harness. One design appears to allow only a restricted swiveling movement of the harness relative to the sulky shaft. In addition, some designs appear to be only suitable for statically connecting the sulky shafts to the harness and may be unsuitably inflexible to allow independent cushioning of the sulky shafts during normal racing conditions. Furthermore, the designs all appear to rely on an interference fit between the sulky shaft end and the harness connector, which may not be suitable to enable independent extension and retraction of the sulky shafts during racing and banking.

Thus there is a need for an improved racing sulky shaft connector device and shaft connector member thereof.

SUMMARY OF THE INVENTION

The present invention reduces the difficulties and disadvantages of the prior art by providing a sulky shaft connector device for use with a racing sulky harness that allows a racehorse harnessed thereto to reach and maintain maximum speed with a significantly more natural gait. To achieve this, a novel ball and socket connection allows a frame, to which the harness is connected, to damply slide along a vertical path of travel relative to a sulky shaft end and to also rotate laterally relative thereto. Moreover, the device is quick fit to allow easy assembly and disassembly from the sulky shaft via a male-female type sulky shaft connector member that is also removably connected to the sulky shaft. The rounded profile of the male end ensures a self-alignment of the two mating connector member parts. Advantageously, this arrangement significantly reduces the workload placed on the horse during a race and increases the horse's athletic performance, while significantly reducing injuries to the horse's upper body and lower legs.

According to an aspect of the present invention, there is provided a sulky shaft connector device for use with a horse harness, the device comprising: a frame for connecting the horse harness thereto, the frame having a first frame end and a second frame end that is spaced apart from the first frame end; and a sulky shaft end member that is connected to a sulky shaft, the frame being movably connected to the sulky shaft end member, the sulky shaft end member being located between the first frame end and the second frame end, the first frame end and the second frame end being movable relative to the sulky shaft end member.

In accordance with another aspect of the present invention, there is provided a sulky shaft connector member for interconnecting a shaft of a sulky and a sulky shaft connector connected to a horse harness, the sulky shaft connector member comprising: a male connector member releasably connecting to a female connector member connected to the sulky shaft connector, the male connector member having a free end adapted for engagement and registration with a lumen of the sulky shaft.

Other objects and advantages of the present invention will become apparent from a careful reading of the detailed description provided. herein, with appropriate reference to the accompanying drawings.

BRIEF DESCRIPTION OF THE DRAWINGS

Further aspects and advantages of the present invention will become better understood with reference to the description in association with the following Figures, in which.

DETAILED DESCRIPTION OF THE PREFERRED EMBODIMENTS

Figure 1:
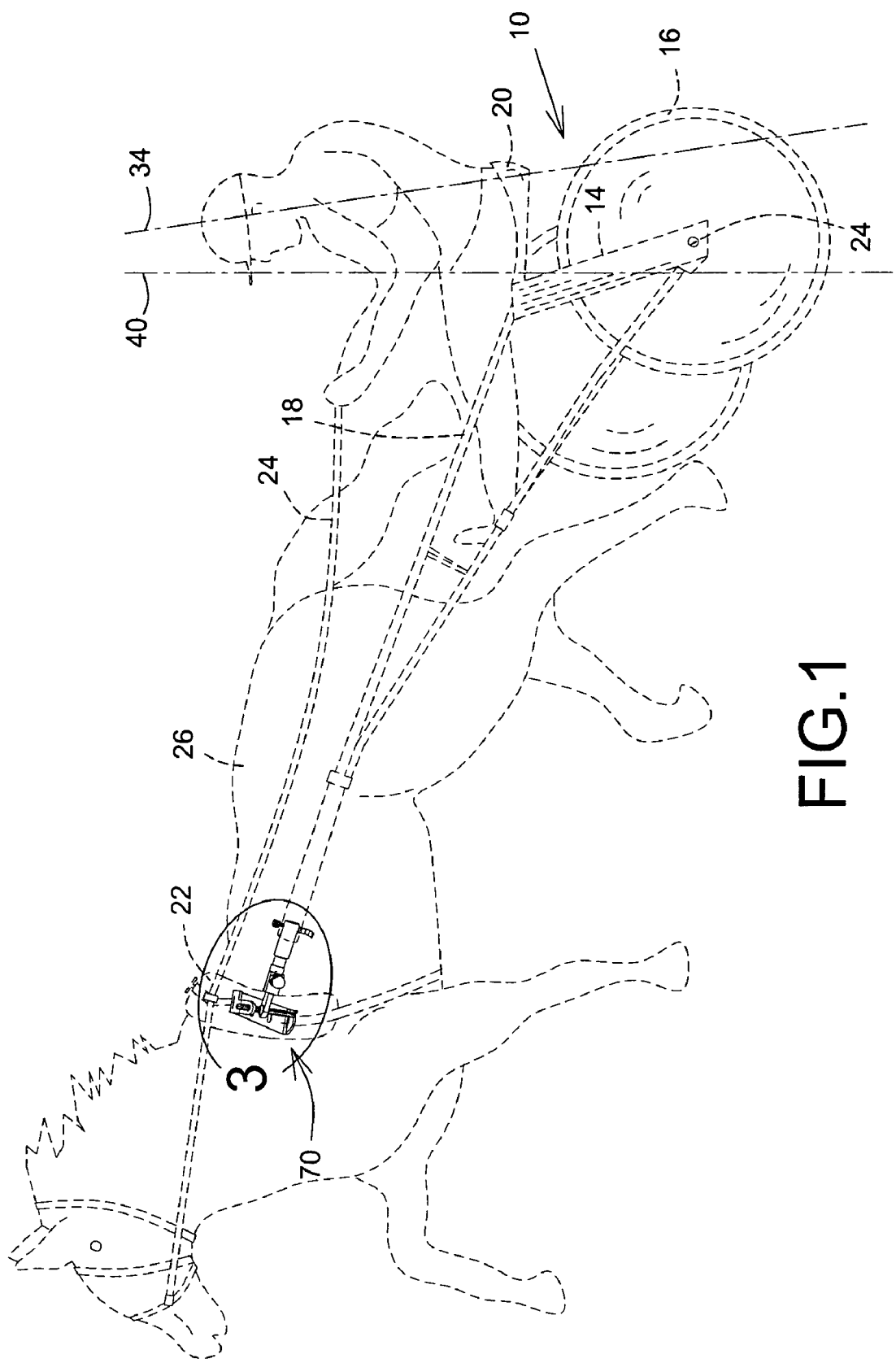
FIG. 1 is a simplified perspective view of a racing sulky with a sulky shaft connector device of the present invention harnessed to a racehorse.
Figure 2:
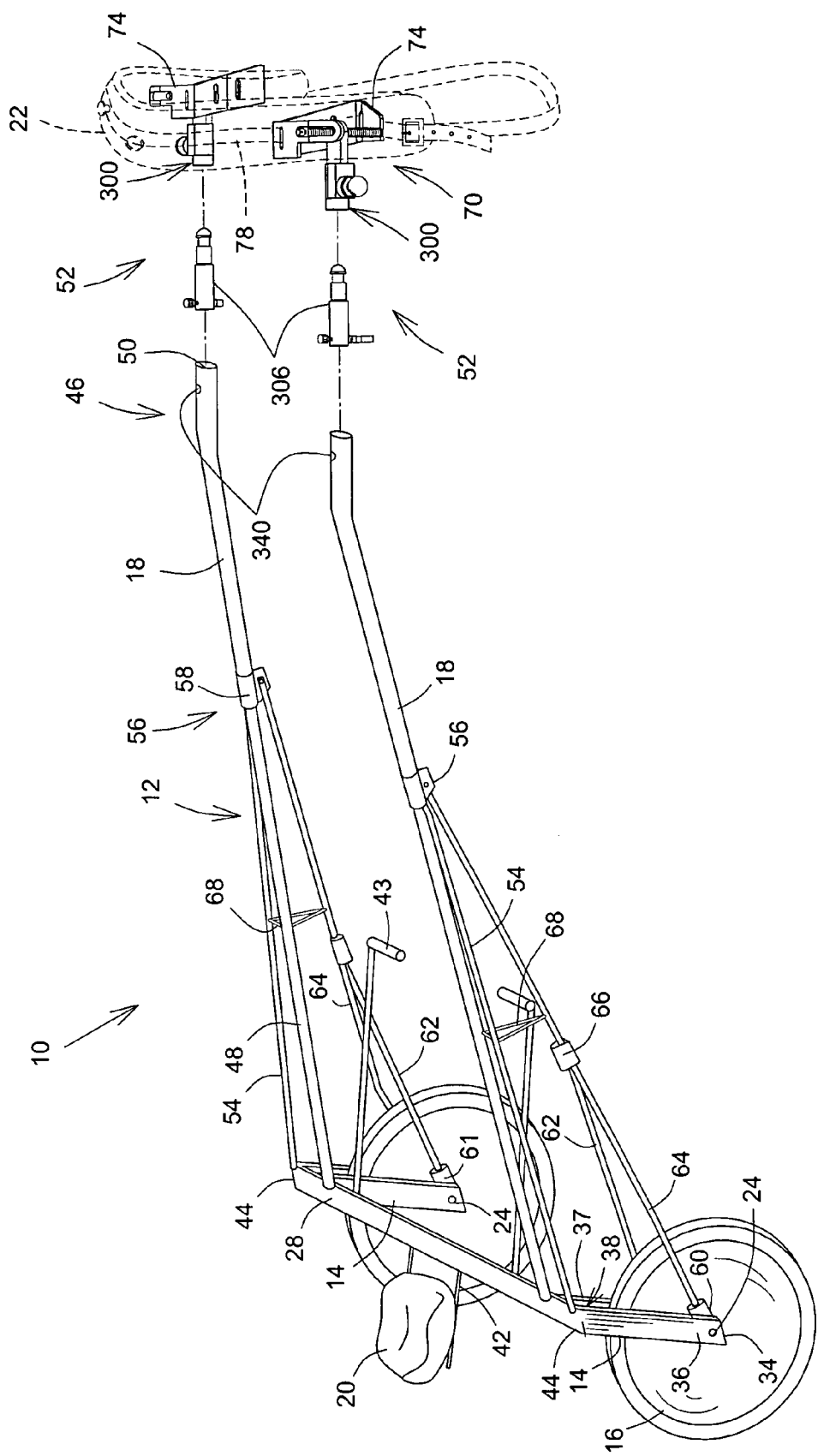
FIG. 2 is a simplified perspective exploded view of the sulky and the sulky shaft connector device of the embodiment of FIG. 1.

Referring now to FIGS. 1 and 2, a racing sulky is shown generally at 10. Broadly speaking, the sulky 10 includes a frame 12, a pair of forks 14, a pair of wheels 16, two elongate sulky shafts 18 and a seat 20. A harness 22 and reins 24 respectively provide a means of connecting the sulky 10 to a horse 26 and controlling the horse 26.

The frame 12 includes a rear cross connector bar 28 to which the two forks 14 are connected. Typically, the forks 14 are welded to the cross connector bar 28, but maybe part of a single piece of material which is machined and formed into the two forks 14. In accordance with the present invention, the forks 14 are angled away from the rear end 30 of the horse 26 and locate a rider's center of mass 34 behind the wheel's axles 24. Since both forks 14 are essentially identical, only one will be described in detail. The fork 14 includes two spaced apart struts 36, 37 that form a gap 38 of sufficient width to allow the wheel 16 to be mounted therebetween on the axle 24. The wheel 16 is connected to a lower end 34 of the struts 36, 37 using conventional fasteners. Preferably, the forks 14 are angled away from a generally vertical y-axis 40 at an angle of from about 1° to about 40°. More preferably, the forks 14 are angled away from the y-axis 40 at about 20°. The fork 14 is made from a straight, generally elongate rectangular piece of substantially rigid, non-resilient material, such as steel and the like.

For greater wheel tracking and cornering around a banked racetrack, the forks 14 are also connected to the cross connector bar 28 such that they are cambered at from about 0.5° to about 5°, more typically at about 2° from the y-axis 40 when viewed from the sulky rear.

As best illustrated in FIG. 2, the seat 20 is connected to the cross connector bar 28 and typically is adjustably mounted on two seat support shafts 42 which allow the seat 20 to be adjusted towards or away from the rear end of the horse 26 depending upon the weight of the rider. Conventional adjustment means (not shown) known to those skilled in the art are typically used. A pair of footrests or stirrups 43 are connected to the cross connector bar 28 are generally orthogonal relative thereto against which the rider rests his heels during operation of the sulky 10. The stirrups 43 may be adjusted to conform to the rider's height.

The two elongate sulky shafts 18 are spaced apart and connected to the end portions 44 of the cross connector bar 28. Each sulky shaft 18 is angled inwardly towards the sides of the horse 26 so that they may be connected to the harness 22 as will be described in more detail below. Since each sulky shaft 18 is essentially identical, only one will now be described in detail.

As seen in FIG. 2, the sulky shaft 18, are typically of tubular construction and include a front portion 46 and a rear portion 48. The front portion 46 includes a lumen 50 sized to receive therein a sulky shaft connector member 52, which is part of a sulky shaft connector device 70 of the present invention. The front portion 46 is angled such that when the sulky 10 is harnessed, the front portion 46 lies generally parallel to the ground. The rear portion 48 may be connected to the cross connector bar 28 by welding or may be of a unitary construction. The sulky shaft 18 is angled upwardly away from the ground to enable the correct racing form to be achieved once the sulky 10 is connected to the harness 22.

A pair of stabilizer bars 54 are connected to the cross connector bar 28 and are located outside of the sulky shaft rear portions 48. Each stabilizer bar 54 is angled towards a connector point 56 located on the sulky shafts 18. A connector collar 58 connects the stabilizer bars 54 to their respective sulky shafts 18 in a triangular configuration.

Each of the lower end 34 of the struts 36, 37 is typically machined to be angled away from the ground and includes a strut connector 60, 61 to which an inner wheel stabilizer shaft 62 and an outer wheel stabilizer shaft 64 are respectively connected. The outer wheel stabilizer shaft 64 extends from the lower end 34 of the strut 36 and is connected to the sulky shaft 18 at the connector collar 58. The outer wheel stabilizer shaft 64 is angled inwardly to connect with the connector collar 58. The inner wheel stabilizer shaft 62 extends from the lower end 34 of the struts 37 and is connected to the outer wheel stabilizer shaft 64 at a connector sleeve 66.

Two triangular shaped connector pieces 68 interconnect the sulky shaft 18, the stabilizer bar 54 and the outer wheel stabilizer shaft 64 and strengthen the sulky 10 and minimizes vertical and lateral movements of the sulky 10 during operation.

Referring now to FIGS. 2, 3, 4, 5 and 7, the sulky shaft connector device 70 of the present invention is used together with the horse harness 22 to enable the sulky 10 to be connected to the horse 26. Since two sulky shaft connector devices 70 are used on either side of the horse 26 and are essentially identical, only one will be described in detail. Broadly speaking, the sulky shaft connector device 70 includes a frame 74, a sulky shaft end member 76 connected to the sulky shaft connector member 52.

As best illustrated in FIG. 2, the frame 74 is connected to the harness 22 using a strap 78. The frame 74 includes two belt connector members 81, 82, (FIGS. 4 and 5) although one skilled in the art will recognize that the strap 78 could be connected to the frame 74 using one of the belt connector members 81 without deviating from the scope of the present invention. Moreover, one skilled in the art will also recognize that many different types of strap connector are available and may be used with the frame 74 without deviating from the scope of the present invention.

The frame 74 includes an upper frame end 84 and a lower frame end 86 that are axially spaced apart. The frame ends 84, 86 are generally flat plate portions that are generally parallel to each other interconnected by an intermediate portion 90 having a projection 92 for stabilizing the strap 78 once the strap has been connected to the frame 74. The frame end 84 has an elongate curved extension 85 incorporating an arcuate slot 202.

A connector shaft 79 is connected between the upper frame end portion 84 and the lower frame end portion 86 with an axis 80. The upper end of the connector shaft 79 is slidably movable within the arcuate slot 202, whilst the lower end of the connector shaft 79 is pivotally mounted on the lower frame end 86 by means of a pin 200. The connector shaft 79 between the upper frame end 84 and the lower frame end 86 defines a limited path of travel for the frame ends 84, 86 to move relative to the sulky shaft end member 76. One skilled in the art will also recognize that the sulky shaft end member 76 may also move along the path of travel between the upper frame end 84 and the lower frame end 86.

Figure 3:
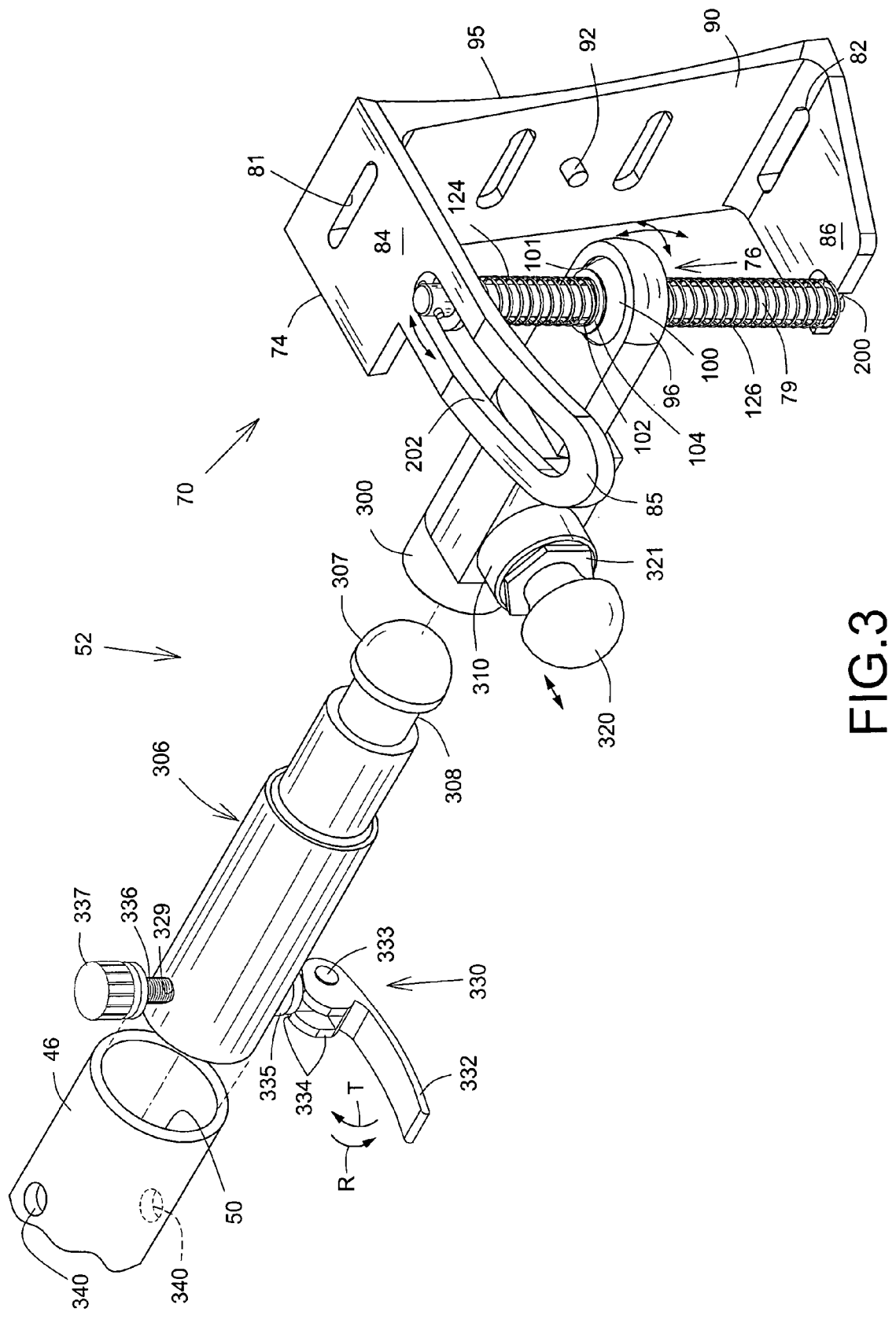
FIG. 3 is a simplified perspective exploded view of the sulky shaft connector device and the sulky shaft connector member of the embodiment of FIG. 1.
Figure 4:
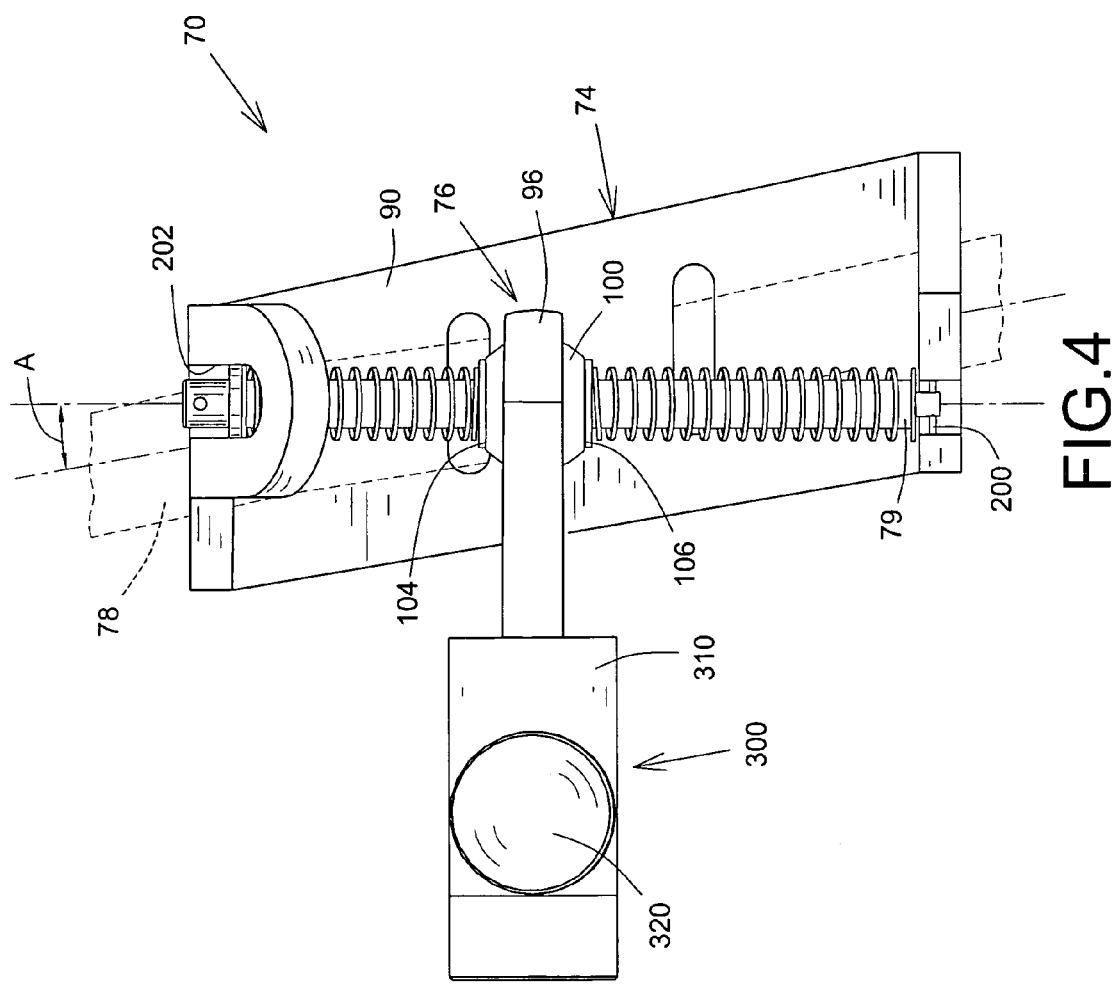
FIG. 4 is a simplified side view of the shaft connector device of FIG. 3.
Figure 5:
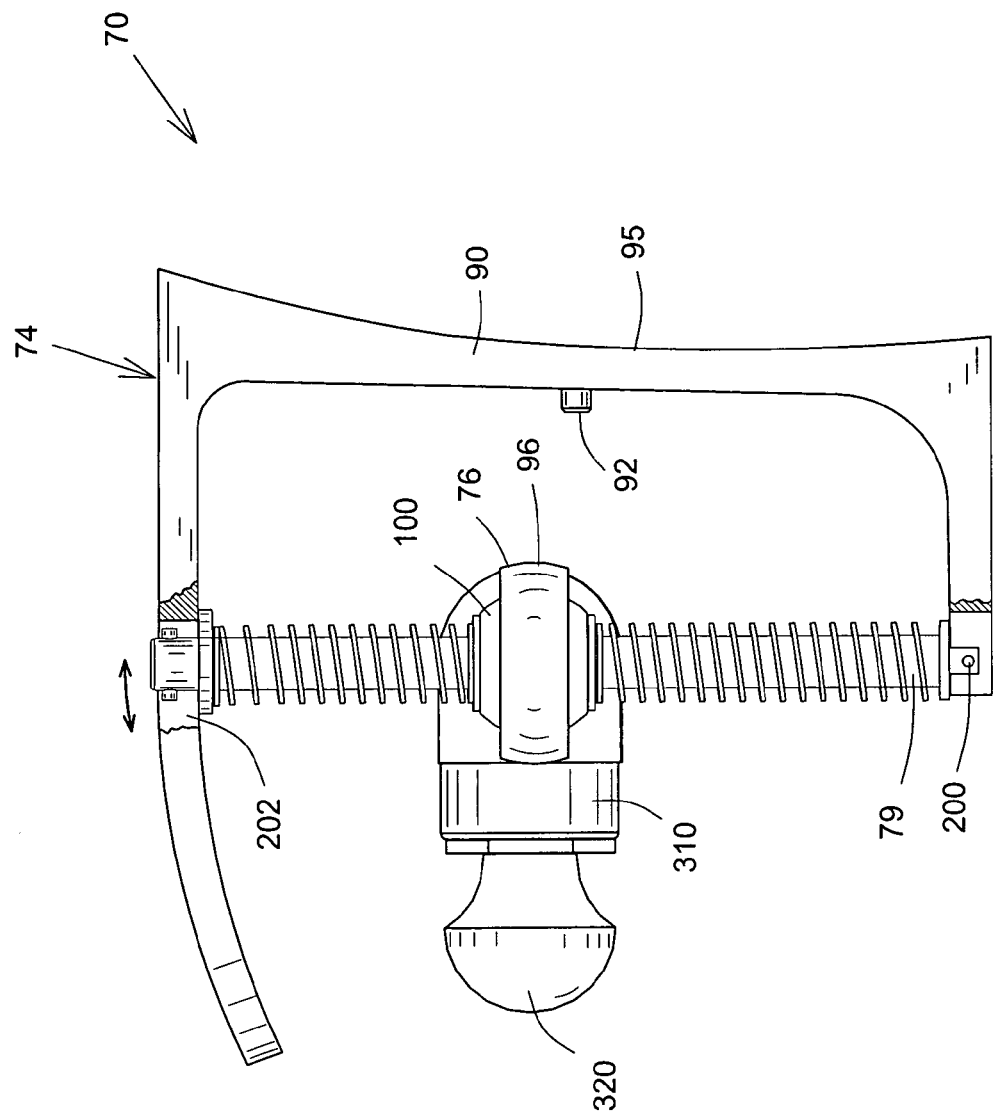
FIG. 5 is simplified partially broken front view of the shaft connector device of FIG. 3.

As best illustrated in FIGS. 3, 4 and 5 the sulky shaft end member 76 includes a socket 96 with a socket opening 98 and a ball member 100 rotatably mounted in the socket opening 98. The socket 96 includes a socket inner sidewall 101 that is concave to rotatably mount the ball member 100 therein. The ball member 100 includes an axial bore 102 and two flattened ends 104, 106. The axial bore 102 is sized to accommodate the connector shaft 79 therein and to allow the ball member 100 to slide towards and away from the frame upper end 84 and the frame lower end 86 along the restricted path of travel.

Referring now to FIGS. 3, 4, and 5, two compression springs 124, 126 are mounted on the shaft 79. The upper compression spring 124 is located between the upper end 84 of the frame 74 and the sulky shaft end member 76, whereas the lower compression spring 126 is located between the lower end 86 of the frame 74 and the sulky shaft end member 76. The springs 124, 126 bias and center the sulky shaft end member 76 between the two spaced apart upper and lower frame ends 84, 86 of the frame 74. This enables the upper and lower ends 84, 86 of the frame 74, which is connected directly to the horse harness 22, as shown in FIG. 2, to move independently of the sulky shaft end member 76 and relative thereto, along, a generally vertical path of travel and also to rotate laterally relative thereto. Since the identical arrangement is found on both sides of the horse, the independent movement and cushioning effect of the both sulky shaft connector devices 70 compensates for the up and down movement of the horse's sides during the normal running gait and also compensates for the differences in horse's body positioning when the horse is cornering around the banked track. The sulky shaft connector device also compensates for increased banking in turns, typically about 12°, while allowing the front portion of the outer sulky shaft, away from the inner part of the track, to rise in direct proportion to the outer wheel, which is raised to a position higher than the inner wheel. Moreover, the ball member 100 is able to rotate within the socket 96, as best illustrated by the arrows in FIG. 3, and compensate for any rotation of the sulky shaft 18 during movement of the horse. While an independent spring and shaft cushioning or suspension system is illustrated, one skilled in the art will readily understand that other independent cushioning or suspension systems may also be employed without deviating from the scope of the invention. Examples of other cushioning or suspension systems include, but are not limited to, hydraulic systems, gas dampers, and the like.

Figure 6:
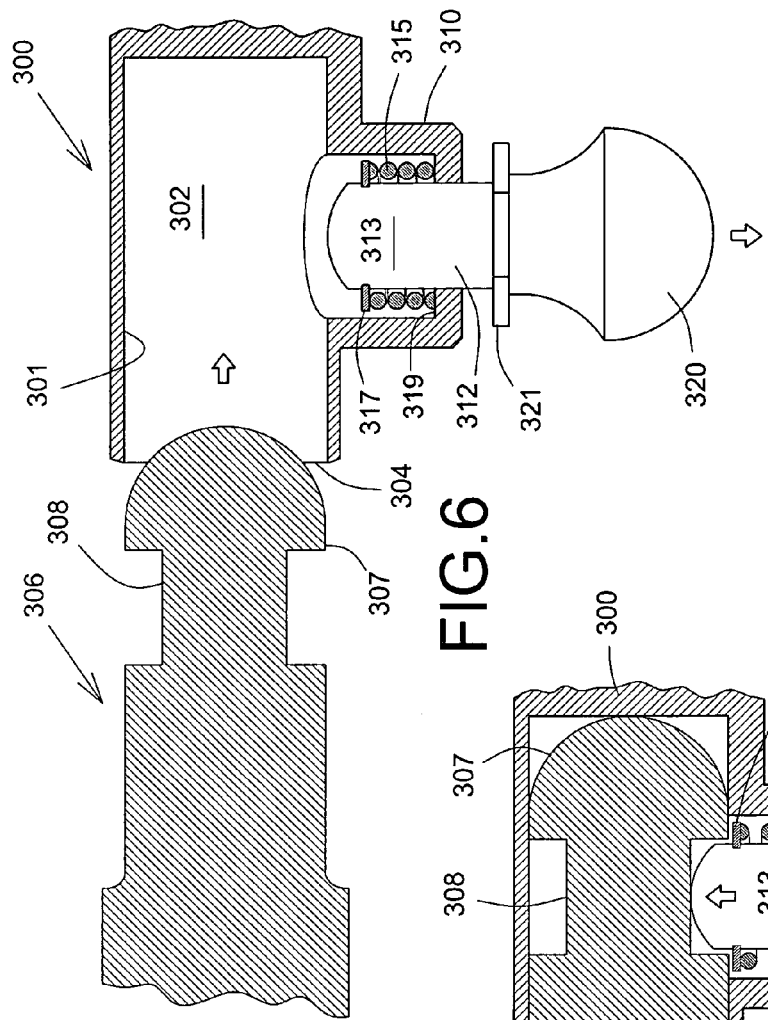
FIGS. 6 and 7 are an enlarged broken section views of the quick release connector of FIG. 3 in a releasing configuration and in a locking configuration; respectively.
Figure 7:
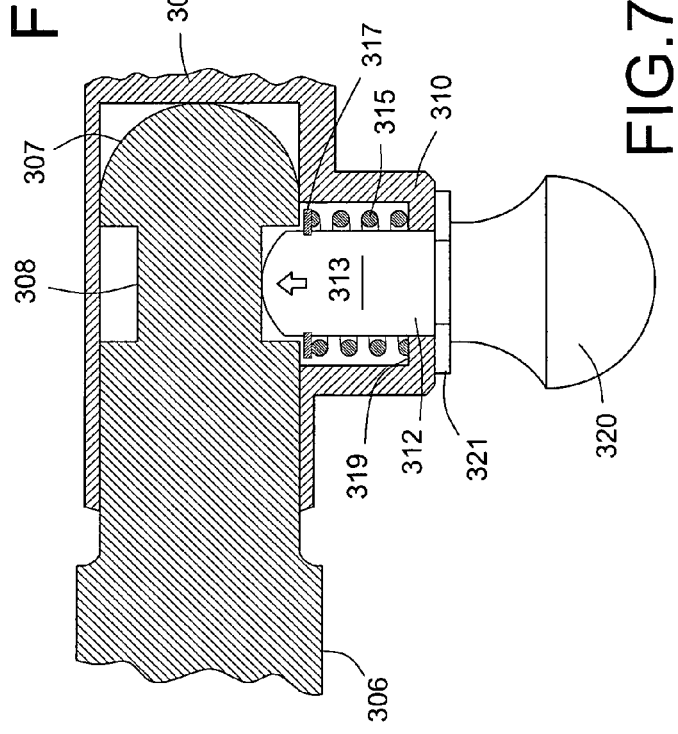

As best illustrated in FIGS. 6 and 7, the socket 96 is located at the end of a female connector fitting 300 providing a generally cylindrical cavity 302 with a mouth 304 for the reception of a male connector member 306 formed with a profiled head 307 of hemispherical form provided with an adjacent circumferential groove 308. The fitting 300 has on its cylindrical wall 301 an entry housing 310 within which is resiliently mounted a detent 312 engageable within the groove 308. The detent includes stub shaft portion 313 around which is located an open coil compression spring 315 held in place on the stub shaft portion 313 between a washer or circlip 317 and a shoulder 319 within the housing 310. The stub shaft portion leads to a knob 320 having a flare 321 for abutment with the exterior of the housing 310 on the other side of the shoulder 319.

As shown in FIG. 3, the male connector member 306 has a through hole 329 extending radially there through at its end remote from the head 307 and receiving a quick release assembly 330 (shown in a releasing configuration in FIG. 3) provided with an operating lever 332 pivotally and radially mounted at 333 on an end of a screw 336 and having a cam face 334 contacting a clamping actuator 335 that is axially and slidably moving along the screw 336. The screw 336 extends into the through hole 329 for registration within a hole 340 provided near the end of front portion 46 of the sulky shaft 18 for clamping the same between the actuator 335 and a nut 337 removably connected to the opposite end of the screw 336.

Operation

A typical operation of the sulky shaft connector device 70 will now be described beginning with the sulky 10 disassembled from the harness 22. The rider inserts the male connector member 306 into the lumen 50 of the front portion 46 of each shaft 18 and registers the through hole 329 with the hole 340 and inserts the screw 336 there through and attaches nut 337 to the screw 336 and then operates the lever 332 in the tightening direction T (FIG. 3) such that the cam face 334 contacts the clamping actuator 335 to secure the male connector member 306 onto the shaft end. The head 307 is then pushed into the cavity 302 (the final axial alignment being ensured by the rounded profile of the head 307 when engaging the cavity 302) wherein the hemispherical head abuts the resiliently biased detent 312 moving against the action of the spring 315 until the detent 312 is forced thereby into registration within the groove 308 (or the detent 312 is simply pulled radially outwardly by the operator fir insertion of the head 307). The shaft 18 is thus positively connected to the harness via the connector 52.

The reverse procedure is adopted to disconnect the shaft from the harness. The rider pulls the knob 320 to remove the detent 312 from the groove 308 allowing release of the head 307 which may then be withdrawn from the cavity 302. Likewise the rider operates the lever 332 in the releasing direction R (FIG. 3) to release the clamp actuator 335 thus allowing withdrawal of the screw 336 from holes 329, 340 (after removing nut 337 from screw 336) and then withdrawal of the male connector member 306 from the lumen 50.

Once the horse 26 begins to move, the frame 74 moves up and down relative to the ball member 100 and the socket 96 (as illustrated by the arrows in FIG. 4). The ball member 100 and the socket 96 arrangement enables multidirectional pivotal movement of the sulky shaft connector device 70 relative to the sulky shaft 18 (as illustrated by the arrows in FIG. 3), which compensates for the horse's movements during racing and significantly reduces or essentially eliminates sulky shaft lateral movement. Furthermore, movement of the frame 74 about the connector shaft 79 is possible by virtue of travel thereof within the slot 202, thus permitting a degree of multi-plane flexibility as between the horse and the harness.

Once assembled, the rider, if desired adjusts the seat 20 and mounts the sulky 10. During racing, the sulky shaft connector device 70 with the compression springs 124, 126, located on each side of the horse, operate as independent suspension and cushioning systems of the sulky 10.

Furthermore, as shown more specifically in FIG. 4, the intermediate portion 90 of the frame 74 is typically angled from the vertical, and from the connector shaft 79, by an angle A of between about 5° and about 15°, preferably about 10°. Accordingly, the intermediate portion 90 follows the harness strap 78 line of direction forward by angle A off the vertical such that the connector shaft 79 remains substantially vertical when the frame 74 is connected to the horse 26. The surface 95 of the intermediate portion 90 facing the horse 26 is generally concave to follow the body shape of the horse 26.

Although the present invention has been described with a certain degree of particularity, it is to be understood that the disclosure has been made by way of example only and that the present invention is not limited to the features of the embodiments described and illustrated herein, but includes all variations and modifications within the scope and spirit of the invention as hereinafter claimed.

We claim:

1. A sulky shaft connector device for use with a horse harness, the device comprising: a frame for connecting the horse harness thereto, the frame having a first frame end and a second frame end that is spaced apart from the first frame end; and a sulky shaft end member that is adapted for connection to a sulky shaft, the frame being movably connected to the sulky shaft end member, the sulky shaft end member being located between the first frame end and the second frame end, the first frame end and the second frame end being movable relative to the sulky shaft end member; wherein a connector shaft extends between and interconnects the first frame end and the second frame end providing a guide path for the sulky shaft end member, the frame having an intermediate portion between the first and second frame ends; wherein the first frame end is provided with a slot within which the connector shaft is slidable, the connector shaft being pivotally connected to the second frame end.

2. A sulky shaft connector device according to claim 1 wherein the sulky shaft end member includes a ball and socket assembly provided with an axial bore through which the connector shaft extends for articulation.

3. A sulky shaft connector device according to claim 2 wherein a resilient damping means is provided on either side of the ball and socket assembly on the connector shaft.

4. A sulky shaft connector device according to claim 2 wherein each resilient damping means is in the form of an open coil compression spring.

5. A sulky shaft connector device according to claim 1 wherein the slot is of arcuate form.

6. A sulky shaft connector device according to claim 1 wherein the frame has an intermediate portion extending between the first frame end and the second frame end, the intermediate portion being angled from the vertical and from the connector shaft.

7. A sulky shaft connector device according to claim 6 wherein the angle lies in the range of about 5° and about 15°.

8. A sulky shaft connector device according to claim 5 wherein the angle is about 10°.

9. A sulky shaft connector device according to claim 1 including a sulky shaft connector member adapted for releasable interconnection in use between a shaft of the sulky and the sulky shaft end member, the free end of the connector member being adapted for engagement and registration with a lumen of the sulky shaft.

10. A sulky shaft connector device according to claim 7 wherein the shaft connector member and the device are interconnected by a quick release connector.

11. A sulky shaft connector device according to claim 8 wherein the quick release connector includes a female connector fitting provided at the end of the sulky shaft end member, the fitting having a cavity for the reception of a male connector member and having an entry housing for a resiliently biased detent.

12. A sulky shaft connector device according to claim 9 wherein the male connector member has a head with a profile for contact with the detent and is provided with a locating groove for the detent.

13. A sulky shaft connector device according to claim 10 wherein the profile is hemispherical.

14. A sulky shaft connector device according to claim 9 wherein the detent is actuable for release by means external to the entry housing.

15. A sulky shaft connector device according to claim 12 wherein the detent has an actuating knob.

16. A sulky shaft connector device according to claim 9 wherein the resilient bias is an open coil compression spring.

17. A sulky shaft connector device according to claim 9 wherein the male connector member is releasably connectable to and registered with the sulky shaft by means of a quick release mechanism including a cam operated clamp.

* * * * *